United States Patent [19]

Chu et al.

[11] Patent Number: 4,537,758
[45] Date of Patent: * Aug. 27, 1985

[54] PROCESS FOR PREPARING HIGHLY SILICEOUS POROUS ZSM-12 TYPE CRYSTALLINE MATERIAL

[75] Inventors: Pochen Chu, West Deptford; Günter H. Küehl, Cherry Hill, both of N.J.

[73] Assignee: Mobil Oil Corporation, New York, N.Y.

[*] Notice: The portion of the term of this patent subsequent to Jun. 5, 2001 has been disclaimed.

[21] Appl. No.: 591,092

[22] Filed: Mar. 19, 1984

Related U.S. Application Data

[63] Continuation-in-part of Ser. No. 288,603, Jul. 30, 1981, abandoned, and a continuation-in-part of Ser. No. 235,116, Feb. 17, 1981, Pat. No. 4,452,769, which is a continuation of Ser. No. 140,466, Apr. 17, 1980, abandoned, which is a continuation of Ser. No. 22,260, Mar. 21, 1979, abandoned.

[51] Int. Cl.³ .............................................. C01B 33/28
[52] U.S. Cl. ...................................... 423/329; 423/333
[58] Field of Search ................................ 423/326–333, 423/334, 338, 339; 502/60, 62, 77, 164

[56] References Cited

U.S. PATENT DOCUMENTS

| | | | |
|---|---|---|---|
| 3,709,979 | 1/1973 | Chu | 423/329 |
| 3,832,449 | 8/1974 | Bosinski et al. | 423/328 |
| 3,941,871 | 3/1976 | Dwyer et al. | 423/326 |
| 4,061,724 | 12/1977 | Grose et al. | 423/335 |
| 4,104,294 | 8/1978 | Grose et al. | 260/448 C |
| 4,275,047 | 6/1981 | Whittam | 423/329 |
| 4,452,769 | 6/1984 | Chu et al. | 423/329 |

FOREIGN PATENT DOCUMENTS

| | | |
|---|---|---|
| 0002079 | 5/1979 | European Pat. Off. . |
| 0018089 | 10/1980 | European Pat. Off. . |
| 0093519 | 9/1983 | European Pat. Off. . |
| 2213109 | 9/1972 | Fed. Rep. of Germany . |

Primary Examiner—Edward J. Meros
Attorney, Agent, or Firm—Alexander J. McKillop; Michael G. Gilman; Edward F. Kenehan

[57] ABSTRACT

A method of preparing a highly siliceous porous crystalline material related to the zeolite ZSM-12 having a composition, in terms of mole ratios of oxides, after dehydration, as follows:

$$(1.0\pm0.4)M_{2/n}O \cdot Al_2O_3 \cdot (20-\infty)SiO_2,$$

wherein M is at least one cation having a valence n, and characterized by an x-ray diffraction pattern whose values are set forth in Table 1 of the specification.

2 Claims, No Drawings

PROCESS FOR PREPARING HIGHLY SILICEOUS POROUS ZSM-12 TYPE CRYSTALLINE MATERIAL

CROSS REFERENCE TO RELATED APPLICATIONS

This application is a continuation-in-part of copending U.S. application Ser. No. 288,603, filed July 30, 1981, now abandoned.

This application is also a continuation-in-part of copending U.S. application Ser. No. 235,116, filed Feb. 17, 1981, now U.S. Pat. No. 4,452,769, which is, in turn, a continuation of U.S. application Ser. No. 140,466, filed Apr. 17, 1980, now abondoned, which is, in turn, a continuation of U.S. application Ser. No. 22,260, filed Mar. 21, 1979, now abandoned.

The entire disclosures of the above-identified applications are expressly incorporated herein by reference.

BACKGROUND OF THE INVENTION

1. Field of the Invention

This invention relates to a highly siliceous porous crystalline material related to the zeolite ZSM-12, and to a method for its preparation.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties. Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as $Ca/2$, $Sr/2$, $Na$, $K$ or $Li$, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), zeolites ZSM-21 and ZSM-38 (U.S. Pat. No. 4,046,859), and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of $SiO_2/Al_2O_3$ ratio is unbounded. ZSM-5 is one such example wherein the $SiO_2/Al_2O_3$ ratio is at least 5, up to infinity. U.S. Pat. No. 3,941,871 now U.S. Pat. No. Re. 29,948, discloses a porous crystalline silicate made from a reaction mixture containing no deliberately added alumina in the recipe and exhibiting the X-ray diffraction pattern characteristic of ZSM-5 type zeolites. U.S. Pat. Nos. 4,061,724, 4,073,865 and 4,104,294 describe crystalline silicates or organosilicates of varying alumina and metal content.

SUMMARY OF THE INVENTION

The present invention is directed to a novel method for preparing highly siliceous porous crystalline materials related to the zeolite ZSM-12 (hereinafter sometimes referred to as "highly siliceous crystals") by crystallization from reaction mixtures containing high-purity silica sources and no deliberately added alumina in the presence of methyltriethyl ammonium ions under controlled alkaline conditions, and the product produced thereby.

The aforementioned highly siliceous crystals are crystalline, three-dimensional continuous framework silicon-containing structures which result when all the oxygen atoms in the tetrahedra are mutually shared between tetrahedral silicons or aluminums, and which can exist with a network of essentially $SiO_2$, i.e., exclusive of any intracrystalline cations. These crystals comprise such materials as quartz, cristobalite and a long list of zeolite structures such as ZSM-5, ZSM-11, ZSM-12, ZSM-23, ZSM-35, ZSM-38, ZSM-48 (described in U.S. application Ser. Nos. 56,754 and 64,703, filed July 12, 1979 and Aug. 8, 1979, respectively), mordenite and perhaps even faujasite. Not all zeolite structures are known to exist at this time in $SiO_2$—only compositions—so the above class does not presently include zeolites such as zeolite A.

The present ZSM-12 related compositions can be identified, in terms of mole ratios of oxides, after dehydration, as follows:

$$(1.0\pm0.4)M_{2/n}O\cdot Al_2O_3\cdot(20-\infty)SiO_2$$

wherein M is at least one cation having a valence n.

Members of the new family of highly siliceous crystals may have Al, Fe, and/or Cr in positions of tetrahedral substitution within the silica lattice. To this extent the latter possesses a negative charge, one excess electron for each such hetero-atom which is balanced by cations. These cations, if present, may be replaced at least in part by other ions using conventional ion exchange techniques. It may be necessary to pre-calcine the crystals prior to ion exchange. Ions introduced to replace the original alkali, alkaline earth and/or organic cations may be any that are desired so long as they can pass through the channels within the subject crystals. Desired replacing ions are those of hydrogen, ammonium and metals of Groups I through VIII of the Periodic Table. Among the metals, those particularly preferred are rare earth metals, manganese, zinc and those of group VIII of the Periodic Table.

Catalytically active members of the family of the boron containing crystals described and claimed herein have a definite X-ray diffraction pattern which distinguishes them from crystalline materials other than zeolite ZSM-12, and the X-ray diffraction pattern having the following significant lines:

TABLE 1

| Interplanar Spacing D (A) | Relative Intensity |
|---|---|
| 11.9 ± 0.2 | M |
| 10.1 ± 0.2 | M |
| 4.7 ± 0.1 | W |
| 4.29 ± 0.08 | VS |
| 3.98 ± 0.08 | M |
| 3.87 ± 0.07 | VS |
| 3.49 ± 0.07 | W |
| 3.38 ± 0.07 | M |
| 3.20 ± 0.06 | W |
| 3.05 ± 0.05 | W |
| 2.54 ± 0.03 | W |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the spectrometer. From these, the relative intensities, 100 $I/I_o$, where $I_o$ is the intensity of the strongest line or peak, and d (obs.), the interplanar spacing in A, corresponding to the recorded lines, were determined. In Table 1, the relative intensities are given in terms of the symbols vs=very strong, s=strong, m=medium, and w=weak. It should be understood that this X-ray diffraction pattern is characteristic of all the species of ZSM-12 zeolite compositions. The sodium form as well as other cationic forms reveal substantially the same pattern with some minor shifts in interplanar spacing and variation in relative intensity. Other minor variations can occur, depending on the silicon to aluminum ratio of the particular sample, as well as its degree of thermal treatment.

Zeolite ZSM-12, U.S. Pat. No. 3,832,449, was originally crystallized in the presence of tetraethylammonium (TEA) ions. By this invention it has been found that the present highly siliceous crystal material crystallizes as well in the presence of methyltriethylammonium (MTEA) cation, if the pH of the reaction mixture is about 13 prior to crystallization.

The new highly siliceous crystal is preferably prepared from a reaction mixture containing a high-purity source of silica, methyltriethylammonium ion (MTEA), an alkali or alkaline earth metal oxide, water, and importantly no deliberately added alumina, at a pre-crystallization pH adjusted to about 13, and having a composition, in terms of mole ratios of oxides, falling within the following ratios:

| REACTANTS | BROAD | PREFERRED |
|---|---|---|
| SiO$_2$/Al$_2$O$_3$ | 200 to ∞ | 400 to ∞ |
| M$_2$O/[(MTEA)$_2$O + M$_2$O] | 0.0 to 0.8 | 0.2 to 0.6 |
| OH$^-$/SiO$_2$ | 0.1 to 1.2 | 0.2 to 1.0 |
| H$_2$O/[(MTEA)$_2$O + M$_2$O] | 50 to 250 | 60 to 200 | wherein MTEA is as above, M is alkali or alkaline earth metal and maintaining the mixture at crystallization temperature until crystals of the new material are formed. When, as here, no alumina is added to the recipe, the only aluminum present occurs as an impurity in some other component of the crystallization medium (with the reagents used in the examples hereinbelow, alumina impurities present therein resulted in up to 615 ppm alumina content in the product).

DESCRIPTION OF PREFERRED EMBODIMENTS

Crystallization can be carried out at either static or stirred condition in polypropylene jars at 210° F. or in teflon-lined stainless steel autoclaves. The total useful range of temperatures is 80° C. to about 180° C. for about 6 hours to 150 days. Thereafter, the crystals are separated from the liquid and recovered. The composition can be prepared utilizing materials which supply the appropriate oxide. Such compositions include sodium silicate, silica hydrosol, silica gel, silicic acid, sodium hydroxide, and an organic compound. The organic compounds contain any element of Group 5-B such as nitrogen or phosphorus, preferably nitrogen. The preferred compounds are quaternary compounds generally expressed by the following formula:

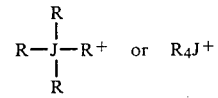

wherein J is an element of Group 5-B of the Periodic Table, e.g., N or P, preferably N, and each R is an alkyl or aryl group having between 1 and 7 carbon atoms, and preferably at least one R group is an ethyl group. The oxide of the quaternary compound is generally supplied by introducing into the reaction mixture a composition such as the hydroxide, chloride or bromide of the tetraalkyl derivative of the desired 5-B element, e.g., methyltriethylammonium chloride (MTEACl). The other elements of Group 5-B behave similarly and thus the new crystals containing the same can be prepared by the same manipulative procedure substituting the other Group 5-B element for nitrogen. It should be realized that the oxide can be supplied from more than one source. The reaction mixture can be prepared either batchwise or continuously. Crystal size and crystallization time of the new crystalline material will vary with the nature of the reaction mixture employed and the crystallization conditions.

In all cases, synthesis of the desired crystals may be facilitated by the presence of at least 0.001 percent, preferably at least 0.10 percent and still more preferably at least 1.0 percent, seed crystals (based on total weight) of crystalline product.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The above highly siliceous crystal, especially in its metal, hydrogen, ammonium, alkylammonium and arylammonium forms, can be beneficially converted to another form for use as a catalyst or an adsorbant by thermal treatment. This thermal treatment is generally performed by heating one of these forms in an atmosphere such as air, nitrogen, hydrogen, steam, etc., at a temperature of at least 700° F. for at least 1 minute and generally not greater than 20 hours to remove part or all of the water and the organic constituent. While subatmospheric pressure can be employed for the thermal treatment, atmospheric pressure is desired for reasons of convenience. The thermal treatment can be performed at a temperature up to about 1700° F. The thermally treated product is particularly useful in the catalysis of certain hydrocarbon conversion reactions.

The above crystal can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenatioan function is to be performed. Such component can be exchanged into the composition, impregnated therein or physically intimately admixed therewith. Such component can be impregnated in or onto it such as, for example, by, in the case of platinum, treating the subject crystalline material with a solution containing a platinum metal-containing ion. Thus, suitable platinum compounds include chloroplatinic acid, platinous chloride and various compounds containing the platinumtetrammine complex.

Simple dehydration of the crystal can also be performed at lower temperatures, such as room temperature, merely by placing the ZSM-12 zeolite type catalyst in a vacuum, but a longer time is required to obtain a sufficient amount of dehydration.

In the case of many catalysts, it is desired to incorporate the new crystal with another material resistant to the temperatures and other conditions employed in organic conversion processes. Such materials include active and inactive material and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new crystal, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials, These clay binders have been employed normally only for the purpose of improving the crush strength of the catalyst.

Naturally occurring clays which can be composited with the new crystal ZSM-12 zeolite type catalyst include the montmorillonite and kaolin family, which families include the subbentonites, and the kaolins commonly known as Dixie, McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxide, notably alumina.

In addition to the foregoing materials, the crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline material and inorganic oxide gel matrix vary widely, with the crystal content ranging from about 1 to about 90 percent by weight.

Employing a catalytically active form of the novel crystal catalyst of this invention which may contain additional hydrogenation components, reforming stocks can be reformed employing a temperature between 700° F. and 1000° F. The pressure can be between 100 and 1000 psig, but is preferably between 200 and 700 psig. The liquid hourly space velocity is generally between 0.1 and 10, preferably between 0.5 and 4, and the hydrogen to hydrocarbon mole ratio is generally between 1 and 20, preferably between 4 and 12.

The catalyst can also be used for hydroisomerization of normal paraffins, when provided with a hydrogenation component, e.g. platinum. Hydroisomerization is carried out at a temperature between 200° F. and 800° F., preferably 300° F. to 750° F., with a liquid hourly space velocity between 0.01 and 2, preferably between 0.25 and 0.50, employing hydrogen such that the hydrogen to hydrocarbon mole ratio is between 1:1 and 5:1. Additionally, the catalyst can be used for olefin or aromatic isomerization, employing temperatures between 30° F. and 700° F.

Other reactions which can be accomplished employing the catalyst of this invention containing a metal, e.g. platinum, include hydrogenation-dehydrogenation reactions and desulfurization reactions, olefin polymerization (oligomerization) and other organic compound conversion such as the conversion of alcohols (e.g. methanol) to hydrocarbon.

In order to more fully illustrate the nature of the invention and the manner of practicing same, the following examples are presented, wherein highly siliceous porous crystalline materials related to the zeolite ZSM-12 of good crystallinity were prepared.

In the examples which follow, whenever adsorption data are set forth for comparison of sorptive capacities for water, cyclohexane and n-hexane, they were determined as follows:

A weighed sample of the calcined adsorbant was contacted with the desired pure adsorbate vapor in an adsorption chamber, evacuated to <1 mm Hg and contacted with 12 mm Hg of water vapor or 20 mm Hg of n-hexane or cyclohexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period, which did not exceed about 8 hours. As adsorbate was adsorbed by the new crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant.

Examples 1-3 are summarized in Table 2 wherein sodium hydroxide was dissolved in water, and the methyltriethylammonium chloride solution was added. Finally, Ludox LS (colloidal silica, 30% $SiO_2$) was added.

TABLE 2
Preparation of Highly Siliceous Crystals with MTEACl

|  | Example No. | | |
| --- | --- | --- | --- |
|  | 1 | 2 | 3 |
| Reaction Mixture Comp. | | | |
| MTEACl, 50%, g | 25 | 35.5 | 35.5 |
| NaOH, 97.6%, g | 4.5 | 2.0 | 2.0 |
| Ludox LS, 30% $SiO_2$, | 144 | 38.2 | 38.2 |
| $H_2O$ | 130 | 178 | 178 |
| Moles/Mole of MTEACl: | | | |
| NaOH | 1.33 | 0.417 | 0.417 |
| $SiO_2$ | 8.73 | 1.63 | 1.63 |
| $H_2O$ | 164 | 106 | 106 |
| Initial pH | 13.19 | 13.12 | 13.11 |
| Aged, Hrs./°C. | —/— | 144/50 | 144/50 |
| Crystallized, Hrs./°C. | 210/160 | 141/160 | 141/170 |
| Final pH | 11.30 | 11.45 | 10.93 |
| Product Properties | | | |
| Crystallinity of ZSM-12 by x-ray Diff., % | 90 | 85 | 95 |
| Sorption, g/100 g: | | | |
| Cyclohexane, 20 Torr | 6.0 | 6.8 | 7.9 |
| n-Hexane, 20 Torr | 5.4 | 6.0 | 6.4 |
| Water, 12 Torr | 9.7 | 3.9 | 1.7 |
| Chemical Composition: | | | |
| $SiO_2$, Wt. % | 88.0 | 87.6 | 90.9 |
| $Al_2O_3$, ppm | 540 | 540 | 490 |
| $Na_2O$, Wt. % | 0.51 | 0.31 | 0.22 |
| N, Wt. % | 0.77 | 1.08 | 0.92 |
| Ash, wt. % | 90.2 | 87.6 | 91.8 |
| $SiO_2/Al_2O_3$, molar | 2770 | 2760 | 3150 |

EXAMPLE 4

Sodium hydroxide (97.6%), 2.0 g., and 1.5 g of oxalic acid were dissolved in 140 g of water. A 50% solution of methyl-triethylammonium chloride, 35.5 g, and, finally, a mixture of 38.2 of Ludox LS and 40 g of water were added. The pH was adjusted to 13.0 with NaOH. The mixture was then heated at 160° C. for 162 hours. The final pH was 11.31. The product gave the X-ray diffraction pattern of ZSM-12 (110% crystallinity compared with the reference ZSM-12 sample). It had the following properties:

| Sorption Capacity, g/100 g: | |
| --- | --- |
| Cyclohexane, 20 Torr | 7.8 |
| n-Hexane, 20 Torr | 6.5 |
| Water, 12 Torr | 5.0 |
| Chemical Composition: | |
| $SiO_2$, wt. % | 89.3 |
| $Al_2O_3$, ppm | 595 |
| $Na_2O$, wt. % | 0.26 |
| N, wt. % | 0.84 |
| Ash, wt. % | 91.2 |
| $SiO_2/Al_2O_3$ | 2550 |

EXAMPLE 5

Sodium hydroxide (97.6%), 2.0 g, and 4.0 g of sodium fluoride were dissolved in 140 g of water. A 50% solution of methyltriethylammonium chloride, 35.5 g, and, finally, a mixture of 38.2 g of Ludox LS (30% $SiO_2$) and 40 g water were added. The mixture was heated at 160° C. for 185 hours. The final pH was 11.69. The product, well developed crystals of up to 10 micron length, gave the X-ray diffraction pattern of ZSM-12 (100% crystallinity compared with the reference ZSM-12 sample) and contained a trace of ZSM-5 as impurity. It had the following properties:

| Sorption Capacity, g/100 g: | |
| --- | --- |
| Cyclohexane, 20 Torr | 7.0 |
| n-Hexane, 20 Torr | 6.9 |
| Water, 12 Torr | 4.3 |
| Chemical Composition: | |
| $SiO_2$, wt. % | 88.1 |
| $Al_2O_3$, ppm | 615 |
| $Na_2O$, wt. % | 0.59 |
| N, wt. % | 0.99 |
| F, wt. % | 0.16 |
| Ash, wt. % | 89.7 |
| $SiO_2/Al_2O_3$, Molar | 2435 |

EXAMPLE 6

A 50% methyltriethylammonium chloride solution, 35.5 g, was diluted with 100 g of water. Solutions of 2.0 g of sodium hydroxide (97.6%) in 10 g of water and of 4.5 g of $Na_2HPO_4$ in 30 g of water were added. A mixture of 38.2 g of Ludox LS (30% $SiO_2$) and 40 g of water was added and the reaction mixture was heated at 160° C. for 185 hours. The final pH was 11.41. The X-ray diffraction pattern of the product was that of ZSM-12 of 80% crystallinity and an unidentified impurity. The material consisted of crystals of the same size and morphology as the product of the previous example, and some crystals of ZSM-5 morphology. The properties were:

| Sorption Capacity, g/100 g: | |
| --- | --- |
| Cyclohexane, 20 Torr | 7.3 |
| n-Hexane, 20 Torr | 7.8 |
| Water, 12 Torr | 4.2 |
| Chemical Composition: | |
| $SiO_2$, wt. % | 88.5 |
| $Al_2O_3$, ppm | 580 |
| $Na_2O$, wt. % | 0.50 |
| N, wt. % | 0.91 |
| P, wt. % | 0.01 |
| Ash, wt. % | 90.6 |
| $SiO_2/Al_2O_3$ Molar | 2594 |

EXAMPLE 7

Sodium hydroxide (97.6%), 2.3 g, was dissolved in 123.9 g of water, and the solution was mixed with 25.5 g of 50% solution of methyltriethylammonium chloride. Finally, 75.0 g of Ludox LS (30% $SiO_2$) was added. The reaction mixture was heated at 160° C. for 387 hours. The final pH was 11.54. The product gave the X-ray diffraction pattern of ZSM-12 (95% crystallinity compared with the reference ZSM-12 sample). It consisted of well-developed crystals, up to 20 microns long, and contained no recognizable crystalline impurity. The properties were:

| Sorption Capacity, g/100 g: | |
| --- | --- |
| Cyclohexane, 20 Torr | 7.6 |
| n-Hexane, 20 Torr | 6.9 |
| Water, 12 Torr | 3.6 |
| Chemical Composition: | |
| $SiO_2$, wt. % | 88.1 |
| $Al_2O_3$, ppm | 515 |

-continued

| | |
|---|---|
| Na₂O, wt. % | 0.42 |
| N, wt. % | 0.92 |
| Ash, wt. % | 89.23 |
| SiO₂/Al₂O₃, Molar | 2908 |

EXAMPLE 8

Sodium hydroxide (97.6%), 2.1 g, was dissolved in 66.9 g of water. A 50% solution of methyltriethylammonium chloride, 36.0 g, and, finally, 100 g of Ludox LS (30% SiO₂) were added. The mixture was heated at 160° C. for 326 hours. The final pH was 11.44. The product gave the X-ray diffraction pattern of ZSM-12 (100% crystallinity compared with the reference ZSM-12 sample) and contained a trace of ZSM-5. It had the following properties:

| | |
|---|---|
| Sorption Capacity, g/100 g: | |
| Cyclohexane, 20 Torr | 8.5 |
| n-Hexane, 20 Torr | 8.5 |
| Water, 12 Torr | 2.7 |
| Chemical Composition: | |
| SiO₂, wt. % | 90.1 |
| Al₂O₃, ppm | 519 |
| Na₂O, wt. % | 0.44 |
| N, wt. % | 0.91 |
| Ash, wt. % | 90.0 |
| SiO₂/Al₂O₃, Molar | 2950 |

Reaction mixture ratios of Examples 1–8 are summarized in Table 3.

TABLE 3

Reaction Mixture Ratios

| Ex. A | SiO₂ | NaOH | Anion | H₂O | OH⁻/SiO₂ | Na/Na + MTEA | H₂O/Na + MTE |
|---|---|---|---|---|---|---|---|
| 1 | 8.73 | 1.33 | — | 164 | 0.152 | 0.571 | 70 |
| 2 | 1.63 | 0.42 | — | 106 | 0.256 | 0.294 | 75 |
| 3 | 1.63 | 0.42 | — | 106 | 0.256 | 0.294 | 75 |
| 4 | 1.63 | 0.50 | 0.10 | 106 | — | 0.333 | 71 |
| 5 | 1.63 | 0.42 | 0.81 | 106 | — | 0.551 | 48 |
| 6 | 1.63 | 0.42 | 0.27 | 106 | — | 0.499 | 54 |
| 7 | 4.46 | 0.67 | — | 125 | 0.15 | 0.4 | 75 |
| 8 | 4.21 | 0.43 | — | 72 | 0.10 | 0.3 | 45 |

(Moles/Mole MTEACl)

what is claimed is:

1. In a process for preparing a zeolite ZSM-12 type crystalline material by preparing a reaction mixture containing a source of an alkali or alkaline earth metal oxide, an oxide of silicon, methyltriethylammonium ion and water, and maintaining said mixture under crystallization conditions until crystals of said zeolite are formed, the improvement which comprises:

preparing the reaction mixture from a high purity silica source, said reaction mixture containing no added alumina, having a pre-crystallization pH of about 13, and having a composition, in terms of mole ratios of oxides, falling within the following ranges:

| | |
|---|---|
| SiO₂/Al₂O₃ | 200 to ∞ |
| M₂O/[(MTEA)₂O + M₂O] | 0.0 to 0.8 |
| OH⁻/SiO₂ | 0.1 to 1.2 |
| H₂O/[(MTEA)₂O + M₂O] | 50 to 250 | wherein M is an alkali or alkaline earth metal and (MTEA)⁺ is a methyltriethylammonium ion.

2. A method according to claim 1 wherein said mixture has a composition, in terms of mole ratios of oxides, falling within the following ranges:

| | |
|---|---|
| SiO₂/Al₂O₃ | 400 to ∞ |
| M₂O/[(MTEA)₂O + M₂O] | 0.2 to 0.6 |
| OH⁻/SiO₂ | 0.2 to 1.0 |
| H₂O/[(MTEA)₂O + M₂O] | 60 to 200 |

* * * * *